United States Patent
Khullar et al.

(10) Patent No.: US 12,430,194 B2
(45) Date of Patent: Sep. 30, 2025

(54) INTELLIGENT ERROR DETECTION FOR ASYNCHRONOUS COMMUNICATION

(71) Applicant: SAP SE, Walldorf (DE)

(72) Inventors: Vipul Khullar, New Delhi (IN); Ayush Kumar, Gorakhpur (IN)

(73) Assignee: SAP SE, Walldorf (DE)

( * ) Notice: Subject to any disclaimer, the term of this patent is extended or adjusted under 35 U.S.C. 154(b) by 125 days.

(21) Appl. No.: 18/470,574

(22) Filed: Sep. 20, 2023

(65) Prior Publication Data

US 2025/0094261 A1    Mar. 20, 2025

(51) Int. Cl.
*G06F 11/00* (2006.01)
*G06F 11/07* (2006.01)
*G06F 40/30* (2020.01)

(52) U.S. Cl.
CPC ...... *G06F 11/0772* (2013.01); *G06F 11/0784* (2013.01); *G06F 40/30* (2020.01)

(58) Field of Classification Search
CPC .................. G06F 11/0772; G06F 11/0784
See application file for complete search history.

(56) References Cited

U.S. PATENT DOCUMENTS

2004/0205770 A1*  10/2004  Zhang ............... G06F 9/546
                                                              719/313
2025/0004910 A1*  1/2025  Baker ............. G06F 11/3612

* cited by examiner

*Primary Examiner* — Philip Guyton
(74) *Attorney, Agent, or Firm* — Buckley, Maschoff & Talwalkar LLC (57) ABSTRACT

Systems and methods include acquisition of an asynchronous message from a message producer, the asynchronous message associated with a message consumer, determination that the asynchronous message matches a stored message, identification, in response to determining that the asynchronous message matches a stored message, of a stored error message associated with the stored message, and return of a return message based on the stored error message to the message producer.

17 Claims, 7 Drawing Sheets

| PRODUCER_ID | CONSUMER_ID | MESSAGE_ID | ERROR MESSAGE |
|---|---|---|---|
| ~~~~~~ | ~~~~~~ | ~~~~~~ | ~~~~~~ |
| ~~~~~~ | ~~~~~~ | ~~~~~~ | ~~~~~~ |
| ~~~~~~ | ~~~~~~ | ~~~~~~ | ~~~~~~ |
| ~~~~~~ | ~~~~~~ | ~~~~~~ | ~~~~~~ |

INTELLIGENT ERROR DETECTION FOR ASYNCHRONOUS COMMUNICATION

BACKGROUND

Modern organizations often utilize a system landscape consisting of distributed computing systems providing various computing services. For example, an organization may deploy services within computing systems located in on-premise data centers (which themselves may be located in disparate geographic locations) and within data centers provided by one or more platform-as-a-service (PaaS) providers. Any number of these computing systems may comprise cloud-based systems (e.g., providing services using scalable-on-demand virtual machines).

An application may consist of one or more of such computing services (e.g., microservices). The services comprising an application may communicate with one another asynchronously. The use of asynchronous communication decouples the services and thereby increases their tolerance to failures of other services. Asynchronous communication may be provided by an event-driven architecture to which the application conforms.

An event-driven architecture triggers the generation and transmission of asynchronous messages in response to detected events. An event may represent a change in the state of a logical entity, or an update thereto. An event-driven architecture includes producers, brokers, and consumers. A producer detects an event, usually occurring at the producer, and transmits a corresponding message to a broker. The broker determines consumers corresponding to the message (e.g., consumers which are "subscribed" to the event) and sends the message thereto. Decoupling producers and consumers in this manner allows these entities to be independently scaled, updated, and deployed.

One drawback of asynchronous communication is the difficulty in detecting and recovering from errors caused by the processing of an asynchronous message at a consumer. In synchronous communication, the sender and receiver are known to each other, and any message-induced errors are returned from the receiver to the sender. Since producers and consumers in an event-driven architecture are not aware of each other, real-time error propagation is difficult.

Some proposed systems insert producer information in each asynchronously-transmitted message so the consumer is able to propagate errors back to the producer. Alternatively, every acknowledgment received by the broker from the consumer may be propagated to the producer along with consumer information obtained from a stored mapping between the consumer and producer. Both approaches require the consumer and producer to handle communication scenarios for which they were not designed and which are typically not central to their core functions.

What is needed are systems to efficiently address error detection in asynchronous communication scenarios.

DETAILED DESCRIPTION

The following description is provided to enable any person in the art to make and use the described embodiments. Various modifications, however, will remain readily-apparent to those in the art.

Some embodiments operate to automatically identify an error message which may result from an asynchronous message, before the asynchronous message is propagated to its consumer(s). The identified error message may be returned to the message producer for handling thereby.

According to some embodiments, a message sent from a producer is compared against a message repository to identify a matching message. If a match is found, an error message corresponding to the matched message (and, in some embodiments, to the producer and intended consumer) is identified from an error repository. The error message is then returned to the producer, who may act on the error message in any desired manner (e.g., resending the message).

A message repository is generated in some embodiments by acquiring messages sent from a producer during productive operation (e.g., while serving productive loads). The messages are grouped into clusters, for example, by generating embeddings of the messages and clustering the embeddings via an unsupervised learning algorithm. The embeddings of each cluster are used to generate many messages corresponding to each cluster. In one example, representative embeddings and/or messages of each cluster are sent to a trained generative artificial intelligence system, which uses this information to generate and return many messages associated with each cluster.

The error repository may be generated by deploying a simulated producer, a simulated broker, and one simulated consumer for each consumer which receives messages sent by the producer. The simulated producer is operated to transmit messages of the message repository, which are routed by the simulated broker to consumers based on routing information known to the simulated broker. The simulated consumers are configured to return any resulting error messages to the simulated broker. The simulated broker stores these error messages in the error repository, in association with an identifier of the producer, the consumer which returned the error message, and an identifier of the message which resulted in the error message.

Figure 1:
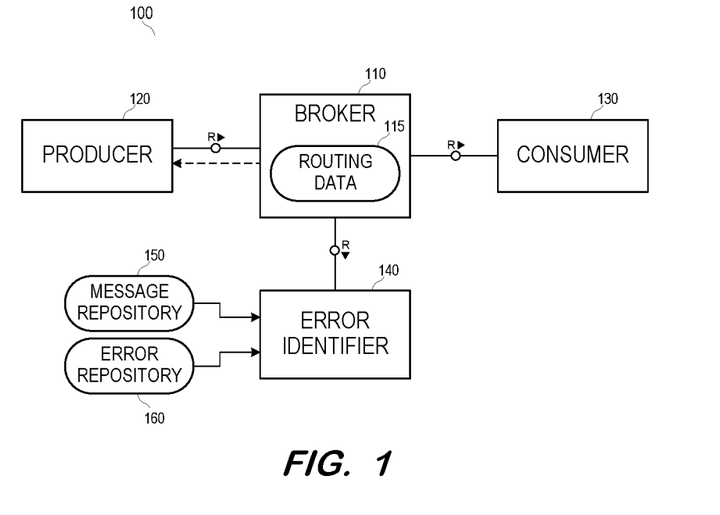
FIG. 1 is a block diagram of a system to identify errors based on asynchronous messages according to some embodiments.

FIG. 1 illustrates system 100 according to some embodiments. The illustrated components of system 100 may be implemented using any suitable combinations of computing hardware and/or software that are or become known. Such combinations may include on-premise computer servers and cloud-based systems in which computing resources are virtualized and allocated elastically. In some embodiments, two or more components are implemented by a single computing device.

Broker 110, producer 120, consumer 130 and error identifier 140 may comprise disparate cloud-based microservices. In some embodiments, each microservice is implemented by a Kubernetes cluster. A Kubernetes cluster consists of many nodes, which in turn may comprise physical servers and/or virtual machines. A node executes an application within a software container. One or more containers may be grouped into a pod, where each container of a given pod shares the same computing resources and local network.

For purposes of the present description, the terms "application" and "service" will be used to describe program code which is executable by a processing unit to cause execution of desired functions. For clarity, an application is described as standalone program code while a service is described as program code which interoperates with one or more other services (e.g., in a microservices architecture) to provide desired functionality. The terms may be used interchangeably, in that a service may also be considered an application and vice versa.

Embodiments may encompass any software architecture providing asynchronous communication. An event-driven architecture connects distributed software systems and is commonly used in applications that rely on microservices. Event-driven architectures are typically realized through the publish/subscribe communication model, in which a publisher pushes messages to a topic to which one or more subscribers may listen via corresponding subscriptions. Other examples employ a message queue-based model, in which a publisher pushes messages to a queue and each subscriber listens to a particular queue. Generally, messages pushed via a publish/subscribe communication model describe events which have occurred, while messages pushed via a message queue-based model include commands intended to change the state of the downstream data.

Different communication models may use different terms for the data which is asynchronously passed between sending and receiving entities, such as event, payload, notification and message. For purposes of the present description, all such data will be referred to as a message. Similarly, the sending entity may be referred to as a producer, a publisher, a sender, a source and the receiving entity may be referred to as a consumer, a subscriber, a receiver and a target, for example. The sending entity will be referred to herein as a producer and the receiving entity will be referred to as a consumer.

Returning to system 100, broker 110 may comprise any known message broker, event broker, etc. which is compatible with the communication architecture of system 100. Broker 110 is responsible for asynchronous filtering, processing, and routing of received messages. Broker 110 accesses routing data 115 during operation.

Routing data 115 may include subscription data in the case of a publish/subscribe model and message queue data in the case of a message queue-based model. In the case of subscription data, routing data 115 may specify an event type and one or more consumers associated with the event type. Accordingly, when broker 110 receives a message associated with the event type, broker 110 consults routing data 115 to determine the consumers to whom the message should be pushed and pushes the message to those consumers.

Producer 120 may comprise any service capable of transmitting messages to broker 110. Producer 120 may be configured to transmit the messages based on the detection of events occurring at producer 120 or an external system. The messages may comprise any suitable data and may include a header and a payload as is known in the art.

Consumer 130 may comprise any suitable service. Consumer 130 may subscribe to one or more topics/messages/events and those subscriptions may be described within routing data 115. Consumer 130 may alternatively or additionally read messages from a message queue maintained by broker 110. Consumer 130 does not provide any acknowledgement or response to producer 120 for messages received from broker 110 and sent by producer 120.

The service providing producer 120 may act as a consumer of messages sent from other services, including from the service providing consumer 130. That is, a service may act as both or either of a producer and consumer of messages according to some embodiments.

Error identifier 140 may receive messages sent by producer 120 from broker 110. For example, broker 110 may receive a message from producer 120 and send a request to identify an error associated with the received message to error identifier 140. In response, error identifier 140 attempts to identify a message stored in message repository 150 which matches the received message. Generation and contents of message repository 160 according to some embodiments will be described below.

If a matching message is identified, error identifier 140 identifies an error associated with the matching message in error repository 160. The error message is returned to broker 110, which transmits a message based on the error message to producer 120. The foregoing actions of broker 110 and error identifier 140 may occur prior to transmitting the original message from broker 110 to consumer 130. Accordingly, upon receiving the error-based message from broker 110, producer 120 may determine not to resend the original message such that consumer 130 never receives the original message.

Figure 2:
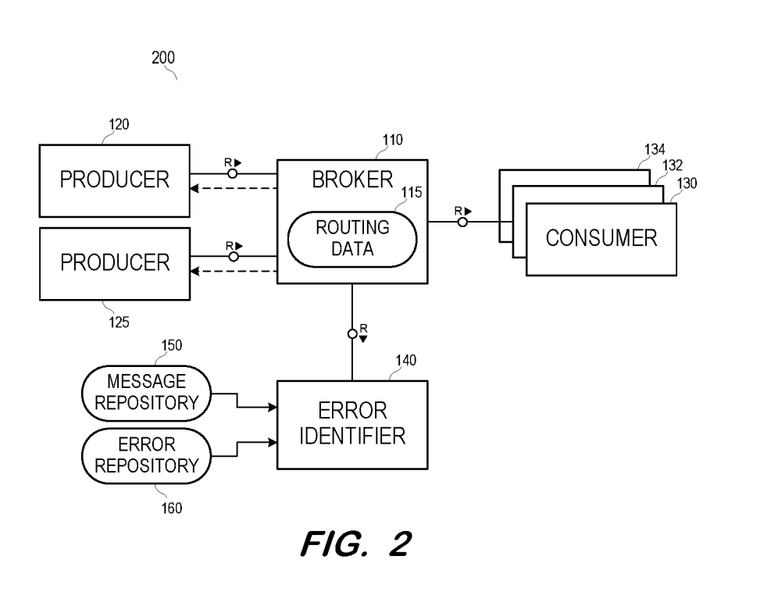
FIG. 2 is a block diagram of a system to identify errors based on asynchronous messages according to some embodiments.

FIG. 2 illustrates system 200 according to some embodiments. System 200 is identical to system 100 except for the inclusion of producer 125 and consumers 132 and 134. As shown, broker 110 and error identifier 140 may be used to manage asynchronous communication between multiple producers and multiple consumers.

More particularly, each of consumers 130, 132 and 134 may subscribe to zero or more different events/topics associated with each of producers 120 and 125. These subscriptions are described in routing data 115 and broker 110 pushes incoming messages to appropriate ones of consumers 130, 132 and 134 based on routing data 115.

Additionally, error identifier 140 may receive requests from broker 110 as described above based on each message received from each of producers 120 and 125. Error identifier 140 operates as described above to identify matching messages of message repository 150 and corresponding error messages from message repository 160. The error messages may be indexed to producer and consumer. For example, error repository 160 may associate a given matching message of message repository 150 with a first error message in case the original message was transmitted by producer 125 for consumption by consumer 132, with a second error message in case the original message was transmitted by producer 120 for consumption by consumer 132, and with a third error message in case the original message was transmitted by producer 120 for consumption by consumer 130.

Figure 3:
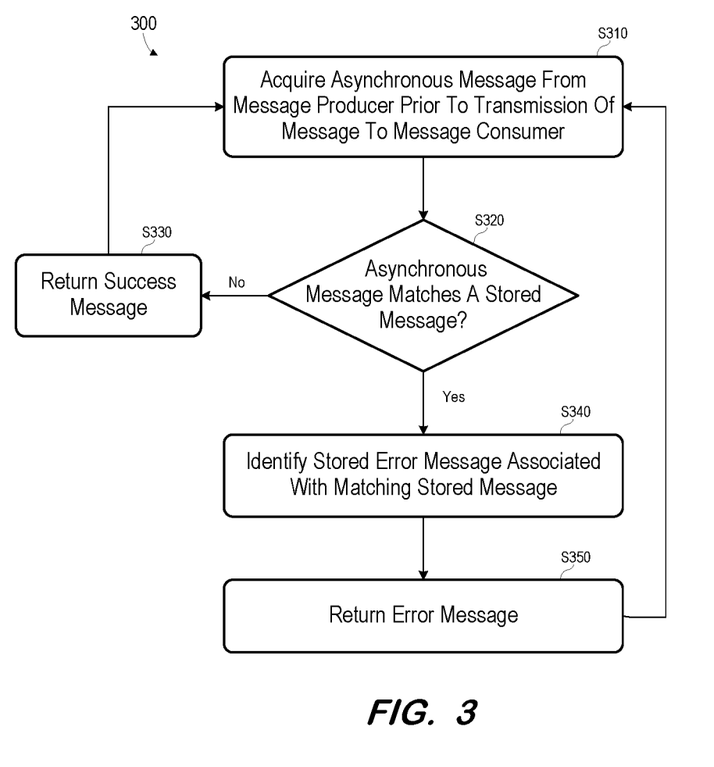
FIG. 3 is a flow diagram of a process to identify errors based on asynchronous messages according to some embodiments.

FIG. 3 comprises a flow diagram of process 300 to identify errors based on asynchronous messages according to some embodiments. Process 300 and the other processes described herein may be performed using any suitable combination of hardware and software, including implementations of system 100 or system 200. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S310, an asynchronous message is acquired from a message producer. The message is acquired prior to transmission of the message to an intended message consumer. For example, error identifier 140 may acquire a message sent by producer 120 to broker 110 which is intended for consumer 130. The message may be acquired from broker 110 at S310 along with a request for error identification.

Next, at S320, it is determined whether the acquired asynchronous message matches a stored message. Any suitable system for comparing messages may be employed at S320. S320 may comprise generating an embedding based on the acquired asynchronous message and comparing the embedding to a set of stored embeddings representing respective messages. Each of the stored embeddings may belong to one of a plurality of clusters and S320 may comprise a determination of whether the embedding generated based on the acquired asynchronous message belongs to any of the clusters. In some embodiments, the embedding generated based on the acquired asynchronous message is sent to a Large Language Model (LLM) to identify a matching message. Embeddings, clusters and the use of an LLM at S320 will be discussed in more detail below.

Flow proceeds to S330 if it is determined at S320 that the acquired asynchronous message does not match a stored message. A success message is returned at S330. If it is determined at S320 that the acquired asynchronous message matches a stored message, a stored error message associated with the matching message is identified at S340. As will be described in detail below, the error message may be stored in an error repository in association with identifiers of the matching message, the producer and the intended consumer, and identified using these identifiers. Generation and contents of such an error repository according to some embodiments will be described below.

The error message is returned to the message producer at S350, for example via broker 110. The error message may be returned to the producer prior to transmission of the asynchronous message to the intended consumer. The returned error message may simply comprise a special error code indicating a potential failure in the consumer due to the message. The producer may determine a next action to perform (e.g., resend message, revise message, abort message) based on the error message. Flow then returns to S310 to await a next asynchronous message.

Figure 4:
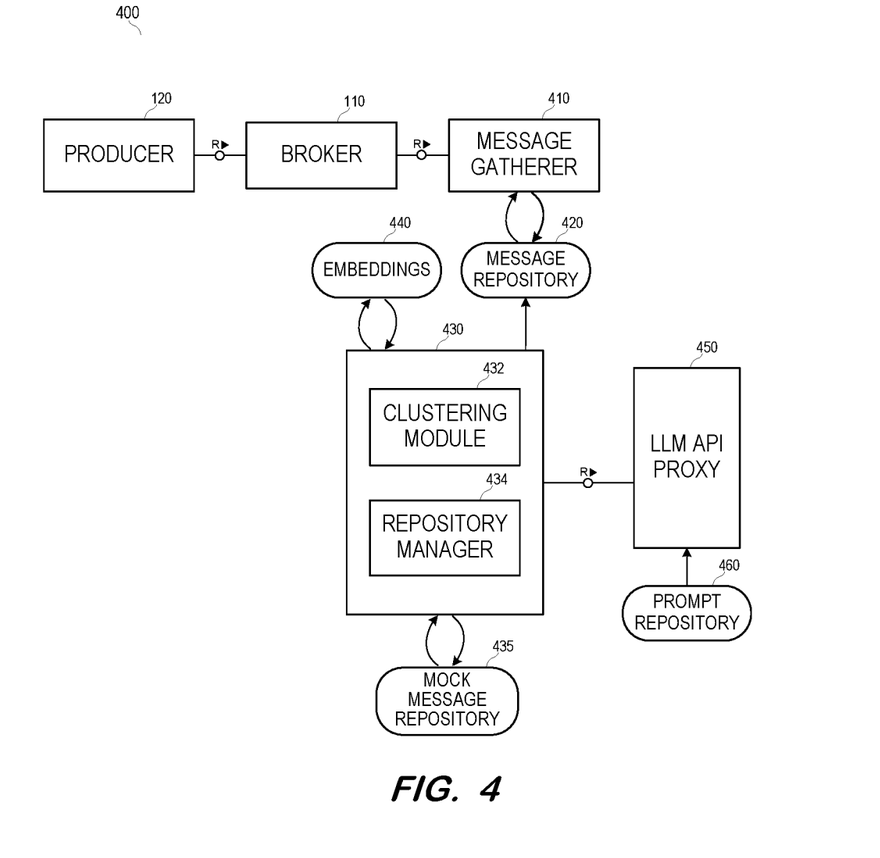
FIG. 4 is a block diagram of a system to generate a mock message repository according to some embodiments.

FIG. 4 is a block diagram of system 400 to generate a mock message repository according to some embodiments. System 400 includes broker 110 and producer 120 as described above. Message gatherer 410 is a component which stores messages sent from broker 110 in message repository 420, and mock message generator 430 operates to generate mock messages for storage in mock message repository 435.

Figure 5:
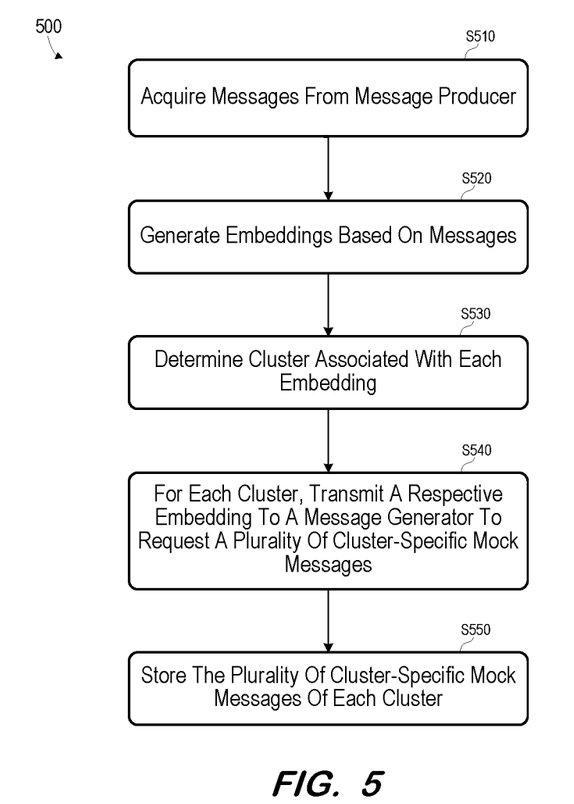
FIG. 5 is a flow diagram of a process to generate a mock message repository according to some embodiments.

Operation of system 400 according to some embodiments will be described with respect to process 500 of FIG. 5. At S510, messages are acquired from a message producer. In some examples, the messages are asynchronous messages sent by producer 120 during productive operation of a service which includes producer 120. The messages are received by broker 110 per an asynchronous messaging architecture and are pushed by broker 110 to one or more designated consumers (not shown in FIG. 4).

Messages pushed by broker 110 to consumers are also acquired by message gatherer 410 and stored in message repository 420 at S510. Message gatherer 410 may perform some filtering, such as ignoring messages for which an identical message is already stored in message repository 420.

Mock message generator 430 generates embeddings based on the acquired messages at S520 and stores the embeddings in embeddings 440. As is known in the art, the embeddings may be generated using the input and hidden layers of a neural network trained to distinguish the messages from one another. Clustering module 432 determines a cluster associated with each embedding, i.e., with each message, at S530. According to some embodiments, clustering module 432 executes an unsupervised learning algorithm as is known in the art to group the generated embeddings into clusters. Such algorithms may include K-means clustering or hierarchical clustering. Each embedding of embeddings 440 may be stored in conjunction with an identifier of the cluster with which it is associated.

A respective embedding for each determined cluster is transmitted to a message generator at S540 to request a plurality of cluster-specific mock messages. Each mock message is intended to be similar to the actual messages of message repository 420 which are associated with a same cluster. The message generator of system 400 is an LLM, but embodiments are not limited thereto.

Mock message generator 430 calls LLM API proxy 450 to request a plurality of cluster-specific mock messages. The call may include, for each cluster, one or more messages whose embeddings are associated with the cluster, one or more embeddings associated with the cluster, a centroid embedding determined based on the embeddings associated with the cluster, or any other combination of information.

Generally, an LLM is a probabilistic model that can generate probabilities of a series of text tokens (i.e., a user prompt) based on one or more system prompts. The call to LLM API proxy 450 may include messages and/or embeddings as described above (i.e., a user prompt) and a reference to one or more prompt templates of prompt repository 460. A prompt template may include a system prompt (i.e., instructions to perform a certain task) and variables (or placeholders) for insertion of the received messages and embeddings. The LLM API passes a completed template including a user prompt and the or more system prompts to the corresponding LLM. Embodiments may utilize other message generators at S540, including but not limited to recurrent neural network-based models and n-gram language models.

The message generator returns the plurality of cluster-specific mock messages to mock message generator 430 and the mock messages are stored in mock message repository 435 at S550. Repository manager 434 may store each mock message in association with an identifier of the cluster to which it belongs. Mock message repository 435 may then be deployed as message repository 150 of system 100 or system 200.

Figure 6:
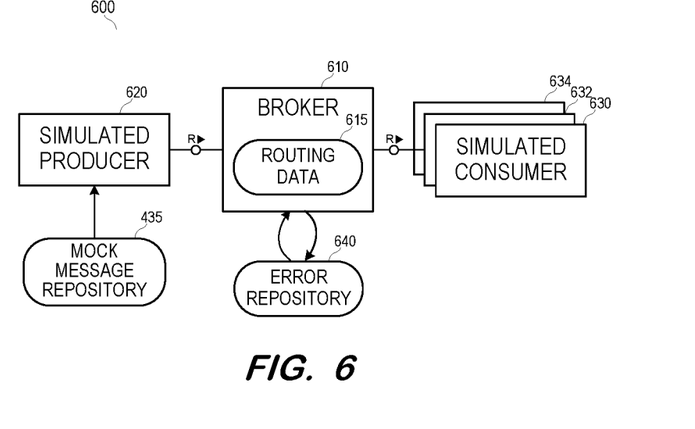
FIG. 6 is a block diagram of a system to generate an error repository based on a mock message repository and simulated services according to some embodiments.

FIG. 6 is a block diagram of system 600 to generate an error repository such as error repository 160 based on a mock message repository and simulated services according to some embodiments.

Simulated producer 620 is a service which includes the asynchronous message-transmitting functions of producer 120. Simulated producer 620 should therefore include any updates, patches, etc. which were applied to producer 120 as of process 500. Simulated producer 620 is operated to transmit messages of mock message repository 435 to broker 610. The messages of mock message repository 435 may be generated and stored as described above with respect to FIGS. 4 and 5.

Broker 610 may also comprise a simulated version of broker 110, and routing data 615 may be identical to routing data 115. Broker 610 routes the messages received from simulated producer 620 to various ones of simulated consumers 630, 632 and 634 based on routing data 615. Simulated consumers 630, 632 and 634 are services which comprise the asynchronous message-consuming functions of respective consumers 130, 132 and 134, and should also include any updates, patches, etc. which were applied to respective consumers 130, 132 and 134 as of process 500.

To preserve computing resources, simulated services include only those software and storage components required to produce the asynchronous messages of its corresponding actual service (in the case of a simulated producer) or to consume the asynchronous messages received by its corresponding actual service (in the case of a simulated consumer). These limitations may allow the use of less powerful computing hardware and storage systems.

Simulated consumers 630, 632 and 634 are also configured to return any error messages resulting from the consumption of asynchronous messages to broker 610. Broker 610 stores these error messages in error repository 640. The messages may be stored in error repository 640 in association with an identifier of the producer simulated by simulated producer 620, the consumer simulated by simulated consumer 630, 632 or 634 which returned the error message, and an identifier of the mock message which resulted in the error message.

Figure 7:
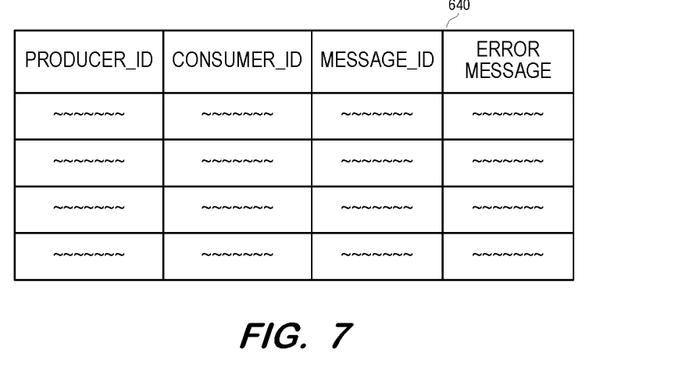
FIG. 7 is a tabular representation of a portion of an error repository according to some embodiments.

FIG. 7 is a tabular representation of a portion of error repository 640 according to some embodiments. Embodiments are not limited to the data types and data values of FIG. 7. Each row of error repository 640 is associated with an error message received by broker 610 from a simulated consumer. Only one instance of each error message need be stored in repository 640 according to some embodiments. In other words, once an error message is received and stored in a row of repository 640, there is no need to store another row in response to receipt of the same error message received from the same consumer based on a same message sent from a same simulated producer.

Figure 8:
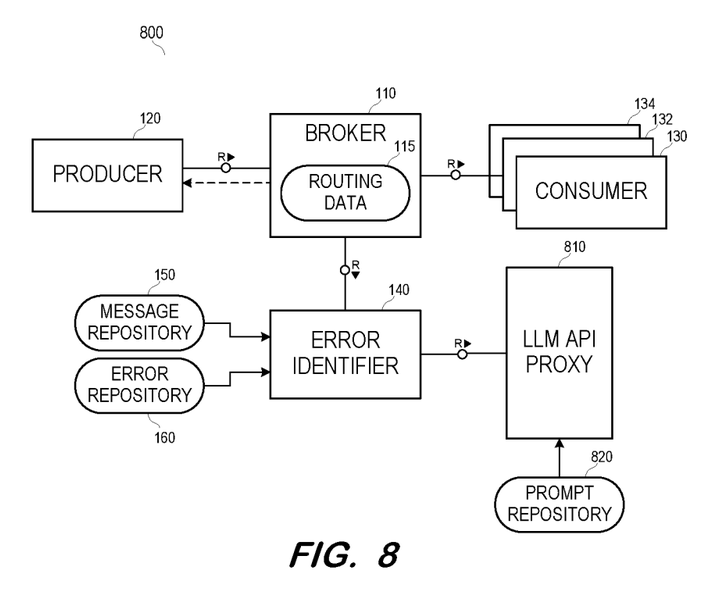
FIG. 8 is a block diagram of a system to identify errors based on asynchronous messages according to some embodiments.

FIG. 8 illustrates system 800 according to some embodiments. System 800 is identical to system 200 except for the inclusion of LLM API proxy 810 and associated prompt repository 820. According to some embodiments, error identifier 140 calls LLM API proxy 810 at S320 to determined whether a received asynchronous message matches a stored message. LLM API proxy 810 may be associated with a same or a different LLM than that used to generate mock messages in some embodiments of S540.

Error identifier 140 may determine whether the asynchronous message exactly matches a message stored in repository 150 and, only if an exact match does not exist, call LLM API proxy 810 at S320. In one example, error identifier 140 transmits the received asynchronous message and the stored messages to LLM API proxy 810 along with a request to identify a best-matching stored message. In other examples, error identifier 140 transmits an embedding generated from the received asynchronous message and embeddings of the stored messages to LLM API proxy 810. Prompt repository 820 stores a prompt template including a system prompt instructing an LLM to determine a best-matching stored message and placeholders for the embeddings or other message data received from error identifier 140.

Figure 9:
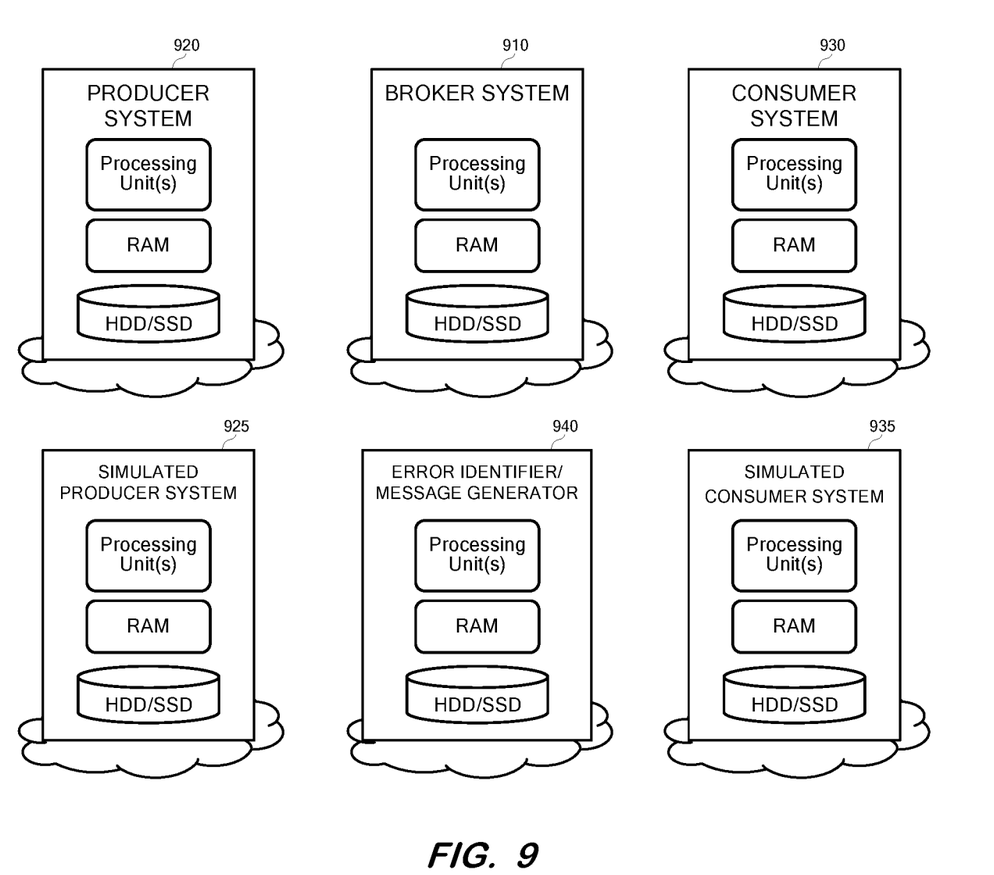
FIG. 9 is a block diagram of cloud-based virtual machines providing microservices and simulated microservices according to some embodiments.

FIG. 9 illustrates cloud servers according to some embodiments. Each illustrated server may comprise a cloud-based virtual machine residing in one or more public clouds providing self-service and immediate provisioning, autoscaling, security, compliance and identity management features.

Broker system 910, producer system 920 and consumer system 930 may comprise elements of a productive microservices architecture of one or more applications. Simulated producer system 925 and simulated consumer system 935 may provide fewer computing resources than respective producer system 920 and consumer system 930. Error identifier/message generator 940 may operate as described above to generate mock messages, capture corresponding error messages, and identify errors during productive operation.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processing unit to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
 a memory storing processor-executable program code; and
 at least one processing unit to execute the processor-executable program code to cause the system to:
 receive a plurality of asynchronous messages from a message producer;
 determine a plurality of clusters based on the plurality of asynchronous messages, wherein each cluster includes two or more of the plurality of asynchronous messages;

for each cluster, generate a plurality of mock messages based on the two or more of the plurality of asynchronous messages of the cluster;

acquire an asynchronous message from the message producer, the asynchronous message associated with a message consumer;

compare the asynchronous message with the plurality of mock messages of each of the clusters to identify a matching mock message; and in response to the identification of the matching mock message:

identify a stored error message associated with the matching mock message; and return the stored error message to the message producer.

2. A system according to claim 1, wherein the stored error message is returned to the message producer prior to transmission of the message to the message consumer.

3. A system according to claim 1, the at least one processing unit to execute the processor-executable program code to cause the system to:

acquire a second asynchronous message from the message producer, the asynchronous message associated with a second message consumer;

compare the second asynchronous message with the plurality of mock messages of each of the clusters to identify a second matching mock message; and in response to the identification of the second matching mock message:

identify a second stored error message associated with the second matching mock message; and return the second stored error message to the message producer.

4. A system according to claim 1, the at least one processing unit to execute the processor-executable program code to cause the system to:

acquire a second asynchronous message from a second message producer, the second asynchronous message associated with the message consumer;

compare the second asynchronous message with the plurality of mock messages of each of the clusters to identify a second matching mock message; and in response to the identification of the second matching mock message;

identify a second stored error message associated with the second matching mock message; and return the second stored error message to the second message producer.

5. A system according to claim 1, the at least one processing unit to execute the processor-executable program code to cause the system to:

acquire a second asynchronous message from the message producer, the second asynchronous message associated with the message consumer;

compare the second asynchronous message with the plurality of mock messages of each of the clusters to identify a second matching mock message; and in response to the identification of the second matching mock message:

identify a second stored error message associated with the second matching mock message; and return the second stored error message to the message producer.

6. A system according to claim 1, wherein comparison of the asynchronous message with the plurality of mock messages of each of the clusters to identify the matching mock message comprises:

transmission of the asynchronous message and the plurality of mock messages to a large language model.

7. A system according to claim 1, the at least one processing unit to execute the processor-executable program code to cause the system to:

transmit the plurality of mock messages for each of the clusters to one or more message consumers; and receive a plurality of error messages from the one or more message consumers in response to the plurality of mock messages, wherein identification of the stored error message comprises identifying one of the plurality of error messages associated with the matching mock message.

8. A computer-implemented method comprising:

receiving a plurality of asynchronous messages from a message producer;

determining a plurality of clusters based on the plurality of asynchronous messages, wherein each cluster includes two or more of the plurality of asynchronous messages;

for each cluster, generating a plurality of mock messages based on the two or more of the plurality of asynchronous messages of the cluster;

acquiring an asynchronous message from the message producer, the asynchronous message associated with a message consumer;

comparing the asynchronous message with the plurality of mock messages of each of the clusters to identify a matching mock message; and in response to identifying the matching mock message:

identifying a stored error message associated with the matching mock message; and returning a return message based on the stored error message to the message producer.

9. A method according to claim 8, wherein the return message is returned to the message producer prior to transmission of the message to the message consumer.

10. A method according to claim 8, wherein comparing the asynchronous message with the plurality of mock messages of each of the clusters to identify the matching mock message comprises:

transmitting the asynchronous message and the plurality of mock messages to a large language model.

11. A method according to claim 8, further comprising:

transmitting the plurality of mock messages for each of the clusters to one or more message consumers; and receiving a plurality of error messages from the one or more message consumers in response to the plurality of mock messages, wherein identifying the stored error message comprises identifying one of the plurality of error messages associated with the matching mock message.

12. A method according to claim 11, wherein comparing the asynchronous message with the plurality of mock messages of each of the clusters to identify the matching mock message comprises:

transmitting the asynchronous message and the plurality of mock messages to the first large language model.

13. A non-transitory computer-readable medium storing processor-executable program code, the program code executable by a computing system to:

receive a plurality of asynchronous messages from a message producer;

determine a plurality of clusters based on the plurality of asynchronous messages, wherein each cluster includes two or more of the plurality of asynchronous messages;

for each cluster, generate a plurality of mock messages based on the two or more of the plurality of asynchronous messages of the cluster;

acquire an asynchronous message from the message producer, the asynchronous message associated with a message consumer;

compare the asynchronous message with the plurality of mock messages of each of the clusters to identify a matching mock message; and in response to identification of the matching mock message:

identify a stored error message associated with the matching mock message; and returning a return message based on the stored error message to the message producer.

14. A non-transitory computer-readable medium according to claim 13, wherein the return message is returned to the message producer prior to transmission of the message to the message consumer.

15. A non-transitory computer-readable medium according to claim 13, wherein comparison of the asynchronous message with the plurality of mock messages of each of the clusters to identify the matching mock message comprises:

transmission of the asynchronous message and the plurality of mock messages to a large language model.

16. A non-transitory computer-readable medium according to claim 13, the program code executable by a computing system to:

transmit the plurality of mock messages for each of the clusters to one or more message consumers; and receive a plurality of error messages from the one or more message consumers in response to the plurality of mock messages, wherein identification of the stored error message comprises identification of one of the plurality of error messages associated with the matching mock message.

17. A non-transitory computer-readable medium according to claim 16, wherein comparison of the asynchronous message with the plurality of mock messages of each of the clusters to identify the matching mock message comprises:

transmission of the asynchronous message and the plurality of mock messages to the first large language model.

\* \* \* \* \*